United States Patent
Kaestner

(10) Patent No.: US 10,976,790 B2
(45) Date of Patent: Apr. 13, 2021

(54) LOAD BALANCING IN MULTI-PORT USB SYSTEMS

(71) Applicant: Microchip Technology Incorporated, Chandler, AZ (US)

(72) Inventor: Clemens Kaestner, Rosenheim (DE)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 15/889,379

(22) Filed: Feb. 6, 2018

(65) Prior Publication Data

US 2018/0224913 A1    Aug. 9, 2018

Related U.S. Application Data

(60) Provisional application No. 62/456,887, filed on Feb. 9, 2017.

(51) Int. Cl.
G06F 1/26 (2006.01)
G06F 13/42 (2006.01)
H02J 1/14 (2006.01)
H02J 7/00 (2006.01)

(52) U.S. Cl.
CPC .......... *G06F 1/266* (2013.01); *G06F 13/4282* (2013.01); *H02J 1/14* (2013.01); *G06F 2213/0042* (2013.01); *H02J 7/00* (2013.01)

(58) Field of Classification Search
None
See application file for complete search history.

(56) References Cited

U.S. PATENT DOCUMENTS

| | | | |
|---|---|---|---|
| 6,222,716 B1 * | 4/2001 | Chiang | H02H 1/04 307/125 |
| 6,905,362 B2 * | 6/2005 | Williams | H01M 2/1083 439/490 |
| 9,748,782 B1 * | 8/2017 | Sheng | H02J 7/0029 |
| 9,789,784 B2 * | 10/2017 | Tistle | H02J 7/007192 |
| 2009/0100275 A1 | 4/2009 | Chang et al. | 713/300 |
| 2012/0019392 A1 | 1/2012 | Yamamoto et al. | 340/664 |
| 2012/0268283 A1 * | 10/2012 | Hsu | G01R 31/043 340/653 |
| 2013/0063098 A1 | 3/2013 | Knowlton et al. | 320/137 |
| 2013/0335010 A1 * | 12/2013 | Wu | H02J 7/0042 320/107 |
| 2014/0015746 A1 * | 1/2014 | Hargreaves | G06F 3/0383 345/157 |

(Continued)

FOREIGN PATENT DOCUMENTS

WO    2014/051610 A1    4/2014    ............. H02J 7/04

OTHER PUBLICATIONS

International Search Report and Written Opinion, Application No. PCT/US2018/017533, 11 pages, dated Apr. 11, 2018.

*Primary Examiner* — Jaweed A Abbaszadeh
*Assistant Examiner* — Cheri L Harrington
(74) *Attorney, Agent, or Firm* — Slayden Grubert Beard PLLC

(57) ABSTRACT

An apparatus includes a processor, USB connectors, and variable resistors or variable current sources. The processor is configured to read and load instructions causing the processor to dynamically adjust a current consumed by a given connector through adjustment of a related variable resistor or variable current source.

38 Claims, 3 Drawing Sheets

(56) References Cited

U.S. PATENT DOCUMENTS

| | | | |
|---|---|---|---|
| 2014/0129856 A1* | 5/2014 | Bertin | G06F 1/325 713/320 |
| 2015/0160674 A1* | 6/2015 | Burdette | G05F 1/66 700/295 |
| 2016/0188514 A1* | 6/2016 | Forghani-Zadeh | G06F 13/385 710/313 |
| 2016/0252939 A1* | 9/2016 | Bang | G06F 1/1626 713/340 |
| 2017/0018339 A1* | 1/2017 | Wang | H01C 7/027 |
| 2017/0108552 A1* | 4/2017 | Roumi | G01R 31/392 |
| 2018/0145516 A1* | 5/2018 | Yu | H02J 7/007 |
| 2018/0275738 A1* | 9/2018 | Pawar | G06F 1/3287 |

* cited by examiner

LOAD BALANCING IN MULTI-PORT USB SYSTEMS

RELATED APPLICATIONS

This application claims priority to U.S. Provisional Application 62/456,887 filed Feb. 9, 2017, the contents of which are incorporated by reference in their entirety.

FIELD OF THE INVENTION

The present disclosure relates to universal serial bus (USB) applications and, more particularly, to load-balancing in multi-port USB systems.

BACKGROUND

Power delivery via USB (e.g., USB Specification 3.1) connections may involve providing and/or consuming power under various operating conditions. For example, a given USB connector that supports power delivery may be coupled to a charging circuit that is configured to sink (e.g., consume) power from a 12-20V input to quickly charge an internal battery of the device, sink power from a 5V input to allow charging from general purpose USB charger, and supply a 5V output to power a USB peripheral device. Conventional charging circuits may use several converters and power switches in order to support all of these functions. While recent developments in bidirectional converters may have reduced the number of converters supporting only a single USB connector, devices with multiple USB connectors may still use a separate Buck converter to provide the 5V output.

Furthermore, the USB Type-C Specification 1.0 has been released. USB-C devices may optionally provide or consume bus power currents of 1.5 A and 3.0 A (at 5 V) in addition to baseline bus power provision. Power sources can either advertise increased USB current through the configuration channel, or they can implement the full USB Power Delivery specification.

SUMMARY

Embodiments of the present disclosure include an apparatus including a processor, USB connectors, and variable resistors or variable current sources. The processor is configured to read and load instructions causing the processor to dynamically adjust a current consumed by a given connector through adjustment of a related variable resistor or variable current source.

Embodiments of the present disclosure include a system including a microcontroller, USB connectors, and variable resistors or variable current sources. The microcontroller may be configured to read and load instructions causing the processor to dynamically adjust a current consumed by a given connector through adjustment of a related variable resistor or variable current source.

In combination with any of the above embodiments, adjustment of the related variable resistor or variable current source is based upon current loads.

In combination with any of the above embodiments, adjustment of the related variable resistor or variable current source is based upon temperature measurement.

In combination with any of the above embodiments, adjustment of the related variable resistor or variable current source correlates to a USB mode of operation.

In combination with any of the above embodiments, adjustment of the related variable resistor or variable current source is based upon current demands maintained over a predetermined time period.

In combination with any of the above embodiments, adjustment of the related variable resistor or variable current source causes an identification of available power.

In combination with any of the above embodiments, adjustment of the related variable resistor or variable current source causes an identification signal communicated through a configuration channel pin.

In combination with any of the above embodiments, adjustment of the related variable resistor or variable current source is performed in response to relative demands between the plurality of the USB connectors.

In combination with any of the above embodiments, adjustment of the related variable resistor or variable current source is performed according to a priority between the plurality of USB connectors.

In combination with any of the above embodiments, the related variable resistor is a pull-up resistor.

Embodiments of the present disclosure may include methods performed by any of the apparatuses or systems described above.

DETAILED DESCRIPTION

Figure 1:
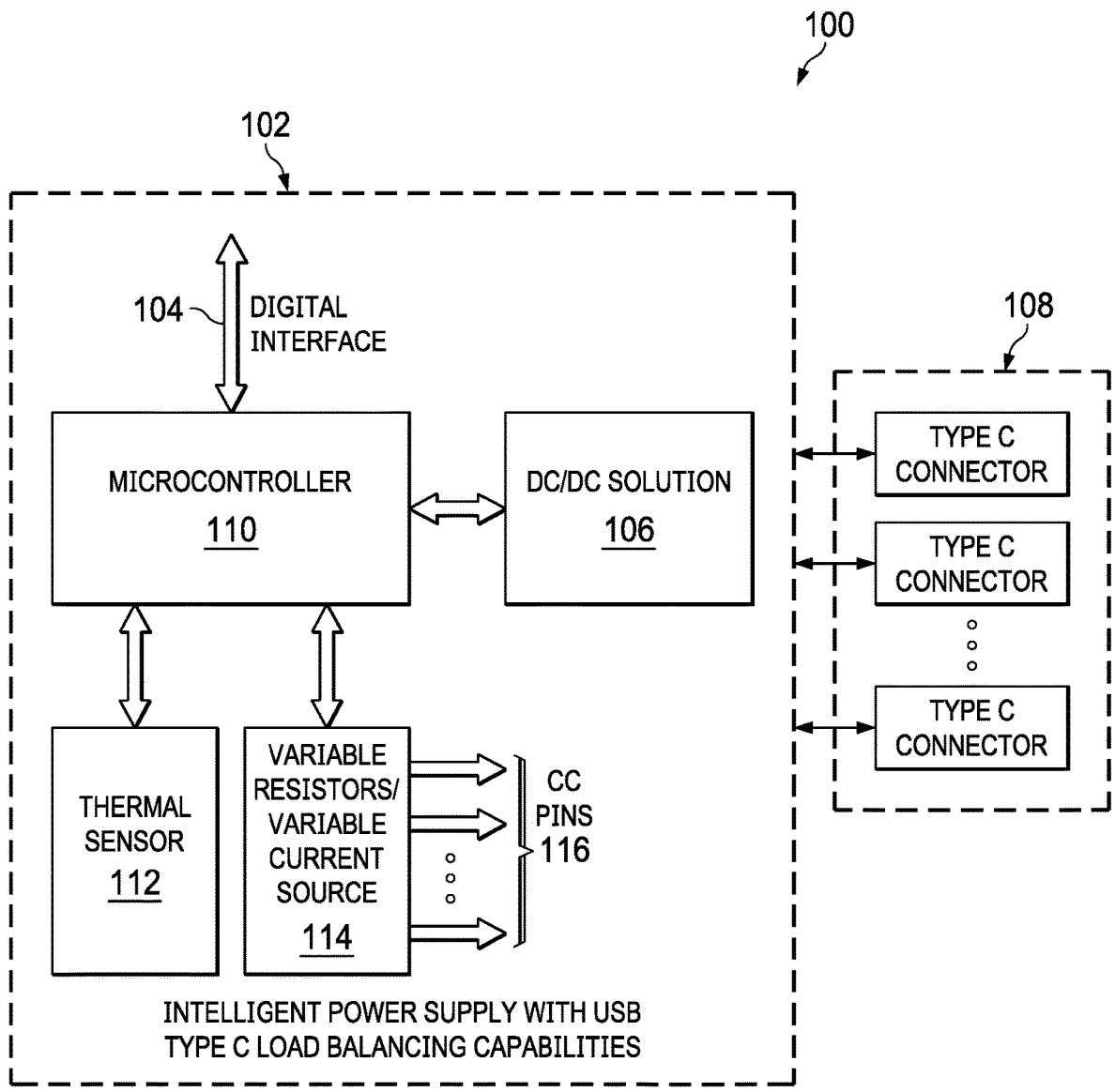
FIG. 1 illustrates an intelligent power supply, according to embodiments of the present disclosure.

FIG. 1 illustrates an example intelligent power supply 100, according to embodiments of the present disclosure. In one embodiment, power supply 100 may include USB Type-C load balancing capabilities. Power supply 100 may be included within any suitable system, controller, hub, or other electronic device.

In one embodiment, power supply 100 may include or be connected to one or more Type-C USB connectors 108. Power supply 100 may include or be connected to any suitable number of Type-C connectors. Power supply 100 may interface through the USB connectors using CC pins 116. Power supply 100 may include a processor or microcontroller 110. Microcontroller 110 may be configured to load and execute instructions from a machine-readable medium. The instructions, when loaded and executed, may cause the processor to perform the load-balancing functionality described herein. Power supply 100 may include a DC-to-DC power conversion circuit 106. In one embodiment, power supply 100 may include one or more variable resistors through which connections to CC pins 116 may be made. In some implementations, variable resistors may be implemented instead by multiple current sources of varying values, corresponding to outputs otherwise produced by variable resistors. A current source may be another mechanism of presenting or implementing current sourcing capabilities of ports via CC pins 116. Thus FIG. 1 illustrates an element 114 that may be implemented using variable resistors or variable current source or sources. Power supply 100 may include a digital interface 104 configured to provide communications and control with other portions of a system in which power supply 100 is implemented. Digital interface 104 may provide function calls, configuration data, results, or other signals. The control and operation of the power supply may be performed by, for example, analog circuitry, digital circuitry, instructions for execution stored in a memory and loaded in a processor, or any suitable combination thereof.

USB Type-C connectors 108 may generally be bi-directional, in contrast to the operation of typical USB Type-A and Type-B connectors. Following typical USB usage, when two elements are connected via USB, one such element may be the USB host (master) and the other such element may be the USB device (slave). The relationship between two USB elements previously could be shown by which element used the USB Type-A connector and which element used the USB Type-B connector. Whereas previously USB Type-A and Type-B connectors were unidirectional and different physical shapes when compared to one another, USB Type-C connectors are bidirectional. The direction of data and power between two elements connected by a USB Type-C connection may be indicated by configuration channel, or "CC". A given USB Type-C port may include two CC pins. Thus, there may be two CC pins 116 for a given USB Type-C connector 108. Connectors and ports formerly considered USB Type-A may be considered Downstream Facing Ports (DFP) under USB Type-C and those formerly considered USB Type-B may be considered Upstream Facing Ports (UFP) under USB Type-C.

A resistor may be placed on each CC pin 116 to mark whether a Type-C port is a DFP or a UFP. A DFP may use a pull-up resistor, denoted Rp, between CC and a positive voltage such as 5V. A UFP may use a pull-down resistor, denoted Rd, between CC and ground. When a DFP on a USB host is connected to a UFP on a USB device, the CC on both sides are connected together. The shared CC line has both a pull-up resistor and a pull-down resistor. Both the USB host and device read the voltage on the line and recognize that a connection has been made when the voltage becomes predictable.

Under the USB Type-3 specification, a cable must be able to support 3 A. A given power supply may or may not be able to support this power level. The USB Type-3 specification may use different values of resistance of Rp in order to allow a given DFP to advertise its supply capabilities. Default USB power may be advertised by use of a 56 kΩ; use of 1.5 A may be advertised by use of a 22 kΩ resistor; and use of 3.0 A may be advertised by use of a 10 k use of a 56 kΩ resistor.

Further values may be used. According to the USB 3.0 specification, section 4.11 "Parameter Values" and "section 4.11.1 Termination parameters", the following table provides the values that are to be used for a DFP's Rp or current source, though other pull-up voltages are allowed if they remain less than 5.5 V and fall within the correct voltage ranges on the UFP side:

TABLE 4-13

| DFP CC Termination (Rp) Requirements | | | |
|---|---|---|---|
| DFP Advertisement | Current Source to 1.7-5.5 V | Resistor pull-up to 4.75-5.5 V | Resistor pull-up to 3.3 V ± 5% |
| Default USB Power | 80 µA ± 20% | 56 kΩ ± 20% (Note 1) | 36 kΩ ± 20% |
| 1.5 A @ 5 V | 180 µA ± 8% | 22 kΩ ± 5% | 12 kΩ ± 5% |
| 3.0 A @ 5 V | 330 µA ± 8% | 10 kΩ ± 5% | 4.7 kΩ ± 5% |

This table from the USB specification identifies acceptable tolerances in the values of the resistors, under either 5V-type sources or 3.3V sources, as well as tolerances in the value of the current sources.

USB elements may follow these guidelines to avoid over-heating or other errors that may arise from providing too much current. Nevertheless, a USB device might be able to handle more power than a USB host is providing.

Power supply 100 may be included within systems that provide multiple USB ports and may have zero to many USB elements attached thereto. Such systems may include automotive or head unit systems. In one embodiment, power supply 100 may allow fast charging of a USB device. In a further embodiment, power supply 100 may allow fast charging of a USB device based upon an identified number of USB devices connected thereto. For example, power supply 100 may allow fast charging of a USB device when only a single USB device is attached. In another, further embodiment, power supply 100 may allow fast charging of USB devices connected thereto. Fast charging may include application of greater current than specified under the USB specification. In such a case, power supply 100 may automatically adjust output when encountering thermal limits. Thermal problems, such as overheating, may arise because while more current is sourced, the space limitations in break out box (BoB) applications (such as USB Hubs with local power supply) often stay the same. Power supply 100 may be configured to detect situations in which such applications to run into thermal limits.

In one embodiment, power supply 100 may be configured to monitor thermal conditions and automatically adjust the current supply capabilities. In another embodiment, the supply may be to multiple USB Type-C downstream ports. The adjustments may be made by using rules in order to limit the effects of reducing the current supply capabilities for best end user experiences. Power supply 100 may make adjustments combining thermal information with information about the attached devices in the local power supply of relevant BoB applications in order to act with or without user intervention. Reducing the power capabilities may be achieved by active dynamic control of single or multiple resistor values of variable resistors/variable current sources 114. Furthermore, reducing the power capabilities may be achieved by active dynamic control of single or multiple current sources of variable resistors/variable current sources 114.

Embodiments of the present disclosure may include a power supply 100 with integrated thermal monitoring. Power supply 100 may, in response to thermal thresholds, may actively control variable resistors 114, such as the DFP Rp pullup resister value, of individual Type-C USB ports of connectors 108. Such active control may dynamically adjust the current supply capabilities to allow improved, optimized, or best user experiences based on a priority scheme.

Any suitable priority scheme may be used by power supply 100. To advertise dynamic current supply capabilities in multi-port USB type C applications, microcontroller 110 may perform active dynamic control of a single resistor value of variable resistors/variable current sources 114, multiple resistor values of variable resistors/variable current sources 114, a single current source of variable resistors/variable current sources 114, or multiple current sources of variable resistors/variable current sources 114. The priority schemes may include priority schemes for an individual port in combination with the other ports. Furthermore, the priority schemes may include priority schemes for an individual port relative to the other ports.

Current monitoring and reporting can be implemented using a UCS2112 available from Microchip Technology. Load balancing between different ports may be initiated via a head unit USB link or a MCP19123 device (available from Microchip Technology). Power supply 100 may be used with any suitable USB BoB interface, module, device, or hub. For example, power supply 100 may be used in automotive applications. Remote units may be used wherein the application includes a USB hub and a local power supply.

Figure 2:
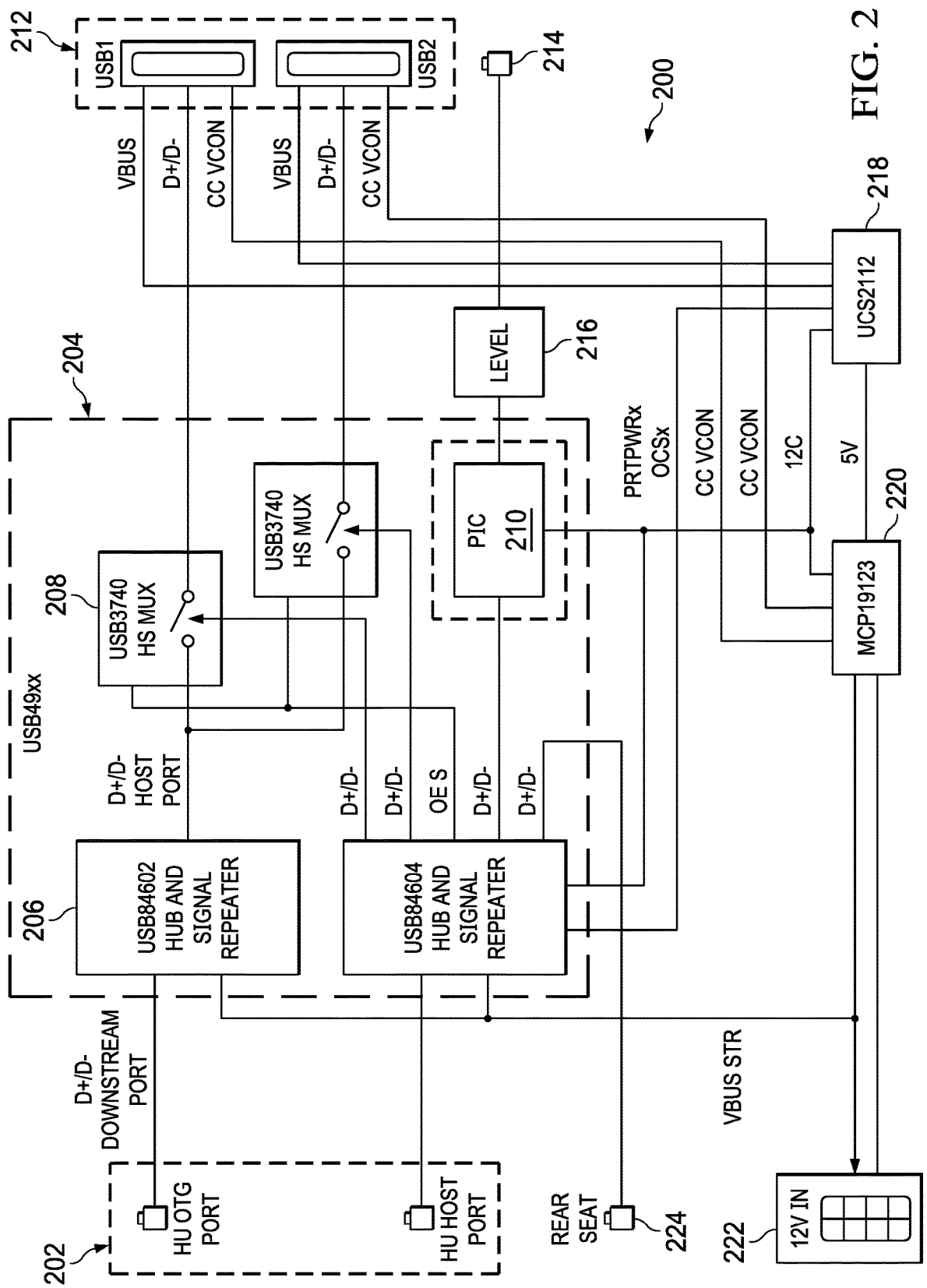
FIG. 2 illustrates an example application, according to embodiments of the present disclosure.

FIG. 2 illustrates an example application 200, according to embodiments of the present disclosure. Application 200 may be an automotive application. Application 200 may include dual upstream USB ports 202. One such USB port may be a USB On-the-Go (OTG) port and one may be a port to a head unit (HU). Application 200 may include a USB hub 204. USB hub 204 may be implemented by a USB49XX series of hubs from Microchip Technology. Application 200 may include four downstream ports. Such downstream ports may include two USB Type-3 connectors 212, a memory card connector 214, and a rear-seat USB connector 224.

USB hub 204 may include hub and signal repeater circuits or chips 206. One of each such chips 206 may be provided for each upstream port. These may be multiplexed to the four downstream ports through high-speed multiplexers 208. Chips 206 may be implemented by USB84602 devices from Microchip Technology. Multiplexers 208 may be implemented by USB3740 devices from Microchip Technology. USB hub 204 may include a PIC microcontroller 208 from Microchip technology configured to administer access to memory card connector 214, which may use a level circuit 216 to match communication values.

In one embodiment, application 200 may include a current and thermal sensor circuit 218. Current and thermal sensor circuit 218 may be implemented by, for example, a UCS2112 device from Microchip Technology. In another embodiment, application 200 may include a microcontroller 220. Microcontroller 220 may be implemented by, for example, a MCP19123 device from Microchip Technology. These may be connected to a power source 222. Power source 222, microcontroller 220, and current and thermal sensor circuit 218 may implement portions of power supply 100 of FIG. 1. As thermal sensor circuit 218 reports increased temperatures, microcontroller 220 may select particular resistor values or current sources to be provided to USB downstream connectors. Microcontroller 220 may handle routing of CC pin signals to USB downstream connectors. Microcontroller 220 or the head unit may initiate load balancing upon an over-temperature situation.

Although application 200 illustrates an automotive application using particular elements, though the principles may be applied to other applications using equivalent elements.

Figure 3:
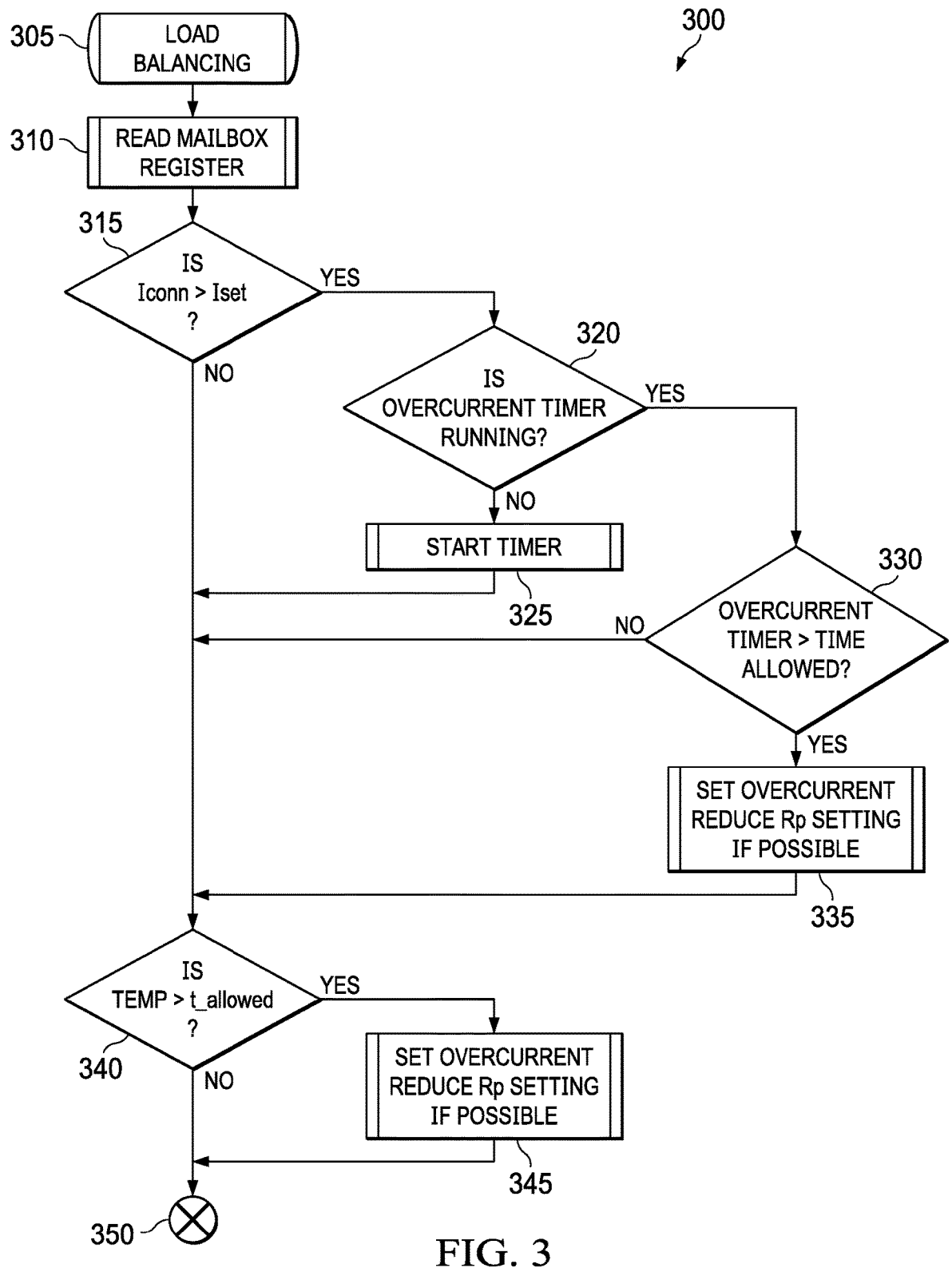
FIG. 3 illustrates an example method, according to embodiments of the present disclosure.

FIG. 3 illustrates an example method 300 for load balancing, according to embodiments of the present disclosure. Method 300 may be performed by power supply 100 or application 200, for example. In particular, method 300 may be performed by microcontrollers within power supply 100 or application 200. Method 300 may be initiated at any step, such as 305. The steps of method 300 may be performed in any suitable order, although an example order is shown in FIG. 3. Steps of 300 may be optionally repeated, omitted, or performed recursively.

At 305, load balancing may begin. At 310, a mailbox register may be read. The mailbox register may be set, for example, by a current comparison circuit such as circuit 218. A mailbox register may be established for each downstream USB port. The mailbox register may be populated with an indication that the respective USB port has a connection with a current greater than a given setpoint current.

At 315, for each mailbox register, the current of the connection may be compared against the setpoint current. If the current of the connection is greater than the setpoint current, method 300 may proceed to 320. If the current of the connection is not greater than the setpoint current, method 300 may proceed to 340.

At 320, it may be checked whether an overcurrent timer is running. If not, method 300 may proceed to 325, wherein the overcurrent timer may be initiated. The overcurrent timers may vary according to thermal design characteristics. An overcurrent timer may be configured to guarantee tolerance against power surges during plugging-in of devices with a high capacitive load. Such a timer may be generally reset after a connection is established. Overcurrent timers may also allow flexibility in systems that are designed to work in environments where the ambient temperature can vary greatly, such as below zero C.° to above fifty C°. Use of an overcurrent timer may allow method 300 to be applied to more than just a high-temperature worst case during all times of operation, as the overloading might consequently be allowed while in lower temperatures. The overcurrent timer duration may match the expected temperature to allow such flexibility. Method 300 may proceed to 340.

If the overcurrent timer is running, method 300 may proceed to 330. At 330, it may be determined whether the overcurrent timer has reached a threshold level denoting a time allowed for overcurrent charging. Threshold levels for the time allowed for overcurrent charging may be determined empirically or according to predictive models wherein a maximum time is allowed while staying within a thermal save zone for the particular design that is implemented. If the overcurrent timer has reached a threshold, method 300 may proceed to 335. Otherwise, method 300 may proceed to 340.

At 335, an overcurrent condition may be identified for the port. Corrective action may be taken. Current supplies may be switched for current supplies with lower current value. A different, lower Rp value may be selected. For example, a next-lowest category of current value or of Rp value may be selected. The reverse situation may occur, wherein a different, higher Rp value may be selected. This may shift current from a present consumer to a new consumer of current. If a device is detected with higher priority according to an applied priority schema, the higher priority device may receive a higher current setting. An already-connected, lower device may receive an adjusted, lower current setting in order to stay within the thermal power budget of the system. Both settings are controlled by the dynamic setting of Rp or the current source. The Rp setting may be associated with present consumers of the current. Adjusting the Rp setting may change the variable resistance and, consequently, the current consumed by the attached device. For example, the variable resistance may be changed to a different value in the table referenced above to achieve a corresponding current value. Overcurrent may refer to an intelligent fuse, such as a port power controller. The value of Rp may tell the USB attached device how much current can be drawn. The overcurrent value may regulate this exchange. The timer may ensure that overcurrent situations do not trip the port power controller functionality.

At 340, it may be determined whether an overtemperature condition has occurred in a connector. The condition may be set in the same mailbox register. If the overtemperature condition has occurred, method 300 may proceed to 345. Otherwise, method 300 may proceed to 350.

At 345, an overcurrent condition may be identified for the port. Corrective action may be taken. Current supplies may be switched for current supplies with lower current value. A different, lower Rp value or current may be selected. For example, a next-lowest category of current value or of Rp value may be selected.

At 350, method 300 may optionally repeat or terminate. For example, method 300 may repeat at 305 or 310.

Steps 310-345 may be carried out for each USB connector. Moreover, multiple instances of the execution of steps 310-345 may be carried out in parallel with each other.

In terms of different priority schemes, an active, present connection may have priority over newly added connections. However, depending upon what is later attached, the priorities may change. An example priority scheme may include, for example, in order, a smart phone, a mobile phone, and a USB mass storage device. Priorities may be handled by a schema stored, for example, in a mailbox register. In one embodiment, the overcurrent functionality may be configured to overwrite the Rp (or current setting) in the mailbox register. Overcurrent functionality coupled with thermal sensing may be part of the intelligent power supply. Priorities can be handled by an upper layer or alternatively also by the intelligent power supply. A mailbox register may be used to link both of these together.

The present disclosure has been described in terms of one or more embodiments, and it should be appreciated that many equivalents, alternatives, variations, and modifications, aside from those expressly stated, are possible and within the scope of the disclosure. While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein.

The invention claimed is:

1. An apparatus, comprising:
a processor;
a plurality of universal serial bus (USB) connectors; and
a plurality of variable resistors;
wherein:
the processor is configured to read and load instructions causing the processor to dynamically adjust a current consumed by a given connector through adjustment of a related variable resistor;
the related variable resistor is included in the plurality of variable resistors and related to the given connector; and
adjustment of the related variable resistor is based upon temperature detection after allowing overcurrent demands from USB elements connected to the connectors maintained over a predetermined time period.

2. The apparatus of claim 1, wherein the adjustment of the related variable resistor is based upon current loads.

3. The apparatus of claim 1, wherein the adjustment of the related variable resistor is based upon temperature measurement.

4. The apparatus of claim 1, wherein the adjustment of the related variable resistor correlates to a USB mode of operation.

5. The apparatus of claim 1, wherein adjustment of the related variable resistor causes an identification of available power.

6. The apparatus of claim 1, wherein adjustment of the related variable resistor causes an identification signal communicated through a configuration channel pin.

7. The apparatus of claim 1, wherein adjustment of the related variable resistor is performed according to a priority between the plurality of USB connectors.

8. The apparatus of claim 1, wherein the related variable resistor is a pull-up resistor.

9. The apparatus of claim 1, wherein adjustment of the related variable resistor is performed in response to relative non-zero demands between the plurality of the USB connectors.

10. A system, comprising:
a microcontroller;
a plurality of universal serial bus (USB) connectors; and
a plurality of variable resistors;
wherein:
the microcontroller is configured to dynamically adjust a current consumed by a given connector through adjustment of a related variable resistor;
the related variable resistor is included in the plurality of variable resistors and related to the given connector; and
adjustment of the related variable resistor is based upon temperature detection after allowing overcurrent demands from USB elements connected to the connectors maintained over a predetermined time period.

11. The system of claim 10, wherein the adjustment of the related variable resistor is based upon current loads.

12. The system of claim 10, wherein the adjustment of the related variable resistor is based upon temperature measurement.

13. The system of claim 10, wherein the adjustment of the related variable resistor correlates to a USB mode of operation.

14. The system of claim 10, wherein adjustment of the related variable resistor causes an identification of available power.

15. The system of claim 10, wherein adjustment of the related variable resistor causes an identification signal communicated through a configuration channel pin.

16. The system of claim 10, wherein adjustment of the related variable resistor is performed in response to relative demands between the plurality of the USB connectors.

17. The system of claim 10, wherein adjustment of the related variable resistor is performed according to a priority between the plurality of USB connectors.

18. A method, comprising:
receiving a current through a given USB connector from a plurality of USB connectors;
determining a priority change for elements connected to the USB connectors; and
based on the priority change, adjusting the current for the given USB connector by adjusting one of a plurality of variable resistors based upon temperature detection after allowing overcurrent demands from USB elements connected to the connectors maintained over a predetermined time period.

19. The method of claim 18, wherein the adjustment of the variable resistor is based upon temperature measurement.

20. The method of claim 18, wherein the adjustment of the variable resistor correlates to a USB mode of operation.

21. The method of claim 18, wherein adjustment of the variable resistor causes an identification of available power.

22. The method of claim 18, wherein adjustment of the variable resistor causes an identification signal communicated through a configuration channel pin.

23. The method of claim 18, wherein adjustment of the variable resistor is performed according to a priority between the plurality of USB connectors.

24. An apparatus, comprising:
a processor;
a plurality of universal serial bus (USB) connectors; and
one or more current sources;
wherein:
the processor is configured to read and load instructions causing the processor to dynamically adjust a current consumed by a given connector through adjustment of a related current source;
the related current source is included in the one or more current sources and related to the given connector; and
adjustment of the related current source is based upon temperature detection after allowing overcurrent demands from USB elements connected to the connectors maintained over a predetermined time period.

25. The apparatus of claim 24, wherein the adjustment of the related current source is based upon current loads.

26. The apparatus of claim 24, wherein the adjustment of the related current source is based upon temperature measurement.

27. The apparatus of claim 24, wherein the adjustment of the related current source correlates to a USB mode of operation.

28. The apparatus of claim 24, wherein adjustment of the related current source causes an identification of available power.

29. The apparatus of claim 24, wherein adjustment of the related current source causes an identification signal communicated through a configuration channel pin.

30. The apparatus of claim 24, wherein adjustment of the related current source is performed according to a priority between the plurality of USB connectors.

31. The method of claim 18, wherein the adjustment of the variable resistor is based upon current loads.

32. A method, comprising:
receiving a current through a given USB connector from a plurality of USB connectors;
determining a priority change for elements connected to the USB connectors; and
based on the priority change, adjusting the current for the given USB connector by adjusting one of one or more variable current sources based upon temperature detection after allowing overcurrent demands from USB elements connected to the connectors maintained over a predetermined time period.

33. The method of claim 32, wherein the adjustment of the current source is based upon current loads.

34. The method of claim 32, wherein the adjustment of the current source is based upon temperature measurement.

35. The method of claim 32, wherein the adjustment of the current source correlates to a USB mode of operation.

36. The method of claim 32, wherein adjustment of the current source causes an identification of available power.

37. The method of claim 32, wherein adjustment of the current source causes an identification signal communicated through a configuration channel pin.

38. The method of claim 32, wherein adjustment of the current source is performed according to a priority between the plurality of USB connectors.

* * * * *